United States Patent [19]

Chang et al.

[11] Patent Number: 4,788,370

[45] Date of Patent: Nov. 29, 1988

[54] CATALYTIC CONVERSION

[75] Inventors: Clarence D. Chang, Princeton; David S. Shihabi, Pennington, both of N.J.; Paul B. Weisz, Yardley, Pa.

[73] Assignee: Mobil Oil Corporation, New York, N.Y.

[21] Appl. No.: 82,397

[22] Filed: Aug. 6, 1987

Related U.S. Application Data

[63] Continuation-in-part of Ser. No. 864,746, May 13, 1986, Pat. No. 4,701,313, which is a continuation of Ser. No. 683,768, Dec. 19, 1984, abandoned.

[51] Int. Cl.$^4$ .................. C07C 12/02; C07C 12/42
[52] U.S. Cl. .................. 585/415; 585/407; 585/533; 585/721; 585/722; 208/115; 423/277; 423/326; 423/328; 423/329; 502/77; 502/85; 502/202
[58] Field of Search .......... 585/415, 407, 533, 721, 585/722; 208/111, 115, 114, 116, 120; 423/277, 326, 328, 329; 502/77, 85, 202

[56] References Cited

U.S. PATENT DOCUMENTS

| Re. 28,341 | 2/1975 | Wadlinger et al. | 208/120 |
| Re. 29,948 | 3/1979 | Dwyer et al. | 502/62 |
| 3,308,069 | 3/1957 | Wadlinger et al. | 502/62 |
| 3,760,024 | 9/1973 | Cattanach | 260/673 |
| 3,827,968 | 8/1974 | Givens et al. | 208/49 |
| 3,960,978 | 6/1976 | Givens et al. | 260/683.15 R |
| 4,021,502 | 5/1977 | Plank et al. | 260/683.15 R |
| 4,100,218 | 7/1978 | Chen et al. | 260/673 |
| 4,120,910 | 10/1978 | Chu | 260/73 |
| 4,150,062 | 4/1979 | Garwood et al. | 260/673 |
| 4,157,293 | 6/1979 | Plank et al. | 208/135 |
| 4,211,640 | 7/1980 | Garwood et al. | 208/255 |
| 4,227,992 | 10/1980 | Garwood et al. | 208/46 |
| 4,268,420 | 5/1981 | Klotz | 208/111 |
| 4,327,236 | 4/1982 | Klotz | 208/111 |
| 4,350,835 | 9/1982 | Chester et al. | 585/415 |
| 4,465,884 | 8/1984 | Degnan et al. | 585/415 |
| 4,504,691 | 3/1985 | Hsia et al. | 585/519 |
| 4,530,756 | 7/1985 | Chany et al. | 208/111 |
| 4,568,655 | 2/1986 | Oleck et al. | 208/111 |
| 4,569,833 | 2/1986 | Cortsema et al. | 208/119 |
| 4,599,162 | 7/1986 | Yen | 208/120 |
| 4,612,108 | 9/1986 | Angevine et al. | 208/97 |
| 4,624,774 | 11/1986 | Chang et al. | 423/305 |
| 4,658,075 | 4/1987 | Dessau et al. | 423/328 |
| 4,701,313 | 10/1987 | Chang et al. | 585/481 |

FOREIGN PATENT DOCUMENTS 0094827 11/1983 European Pat. Off. ............ 208/111

Primary Examiner—H. M. S. Sneed
Assistant Examiner—Helane Myers
Attorney, Agent, or Firm—Alexander J. McKillop; Michael G. Gilman; Dennis P. Santini

[57] ABSTRACT

A process is provided for converting feedstock comprising $C_2+$ olefins, $C_2-C_7$ paraffins or mixtures thereof to product comprising $C_5+$ hydrocarbons over a catalyst comprising a siliceous zeolite prepared by the method comprising providing zeolite Beta containing boron and aluminum, treating the zeolite with silicon tetrachloride at a temperature and for a time sufficient to replace boron with silicon, and recovering the siliceous zeolite having reduced boron content but substantially preserved initial aluminum content.

16 Claims, 1 Drawing Sheet

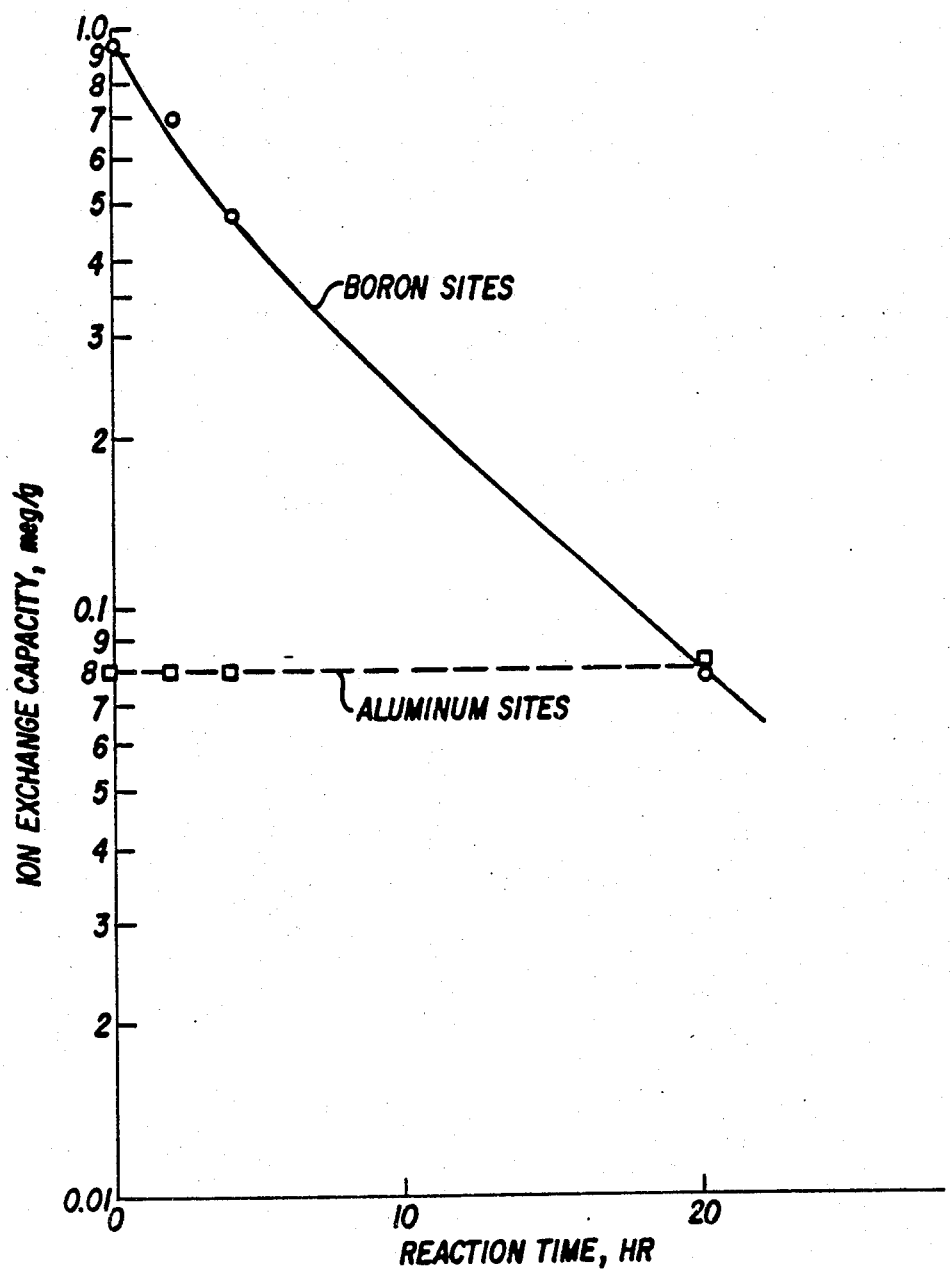
REACTION OF SiCl$_4$ WITH BORON BETA ZEOLITE

CATALYTIC CONVERSION

CROSS-REFERENCE TO RELATED APPLICATION

This application is a continuation-in-part of application Ser. No. 864,746, filed May 13, 1986, now U.S. Pat. No. 4,701,313, which was a continuation of application Ser. No. 683,768, filed Dec. 19, 1984, now abandoned.

BACKGROUND OF THE INVENTION

1. Field of the Invention

This invention relates to a process for conversion of feedstock comprising $C_2^+$ olefins, $C_2$–$C_7$ paraffins or mixtures thereof to product comprising $C_5^+$ hydrocarbons. The process comprises contacting, under conversion conditions, said feedstock with a catalyst comprising a siliceous zeolite having been prepared by the method comprising providing a boron-containing zeolite Beta, treating the zeolite with silicon tetrachloride at a temperature and for a time sufficient to replace boron with silicon, and recovering the siliceous zeolite having reduced boron content but preserved initial aluminum content.

2. Description of Prior Art

Zeolitic materials, both natural and synthetic, have been demonstrated in the past to have catalytic properties for various types of hydrocarbon conversions. Certain zeolitic materials are ordered, porous crystalline silicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and $AlO_4$ in which the tetrahedra are cross-linked by the sharing of oxygen atoms whereby the ratio of the total non-silicon lattice element, e.g. aluminum, and silicon atoms to oxygen is 1:2. the electrovalence of the tetrahedra containing, for example, aluminum is balanced by the inclusion in the crystal of a cation, for example, an alkali metal or an alkaline earth metal cation. This can be expressed wherein the ratio of the non-silicon lattice element, e.g. aluminum, to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given crystalline silicate by suitable selection of the cation. The spaces between the tetrahedra are occupied by molecules of water prior to dehydration.

Prior art techniques have resulted in the formation of a great variety of synthetic crystalline silicates. These silicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

The silica-to-alumina ratio of a given zeolite is often variable; for example, zeolite X (U.S. Pat. No. 2,882,244) can be synthesized with a silica-to-aluminum ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an X-ray diffraction pattern characteristic of ZSM-5. U.S. Pat. Nos. 4,061,724; 4,073,865 and 4,104,294 describe microporous crystalline silicas or organo silicates wherein the aluminum content present is at impurity levels. Zeolite Beta is described in U.S. Pat. No. 3,308,069, the contents of which are entirely incorporated herein by reference.

U.S. Pat. Nos. 3,960,978 and 4,021,502, disclose conversion of $C_2$–$C_5$ olefins, alone or in admixture with paraffinic components, into higher hydrocarbons over crystalline zeolites having controlled acidity. U.S. Pat. Nos. 4,150,062, 4,211,640 and 4,227,992 teach processing techniques for conversion of olefins to gasoline and distillate. U.S. Pat. No. 4,504,691 teaches a multi-step process for converting olefinic feedstock comprising ethylene and $C_3^+$ olefins to heavier liquid hydrocarbon product. The above identified disclosures are incorporated herein by reference.

U.S. Pat. No. 3,760,024 claims a process for producing aromatic compounds from $C_2$–$C_4$ paraffins, olefins or mixtures thereof. U.S. Pat. No. 3,827,968 claims a process for conversion of $C_5^-$ olefin-containing gas to product comprising aromatics. U.S. Pat. No. 4,120,910 claims a process for converting a gaseous paraffinic hydrocarbon feedstock containing ethane to aromatic compounds. U.S. Pat. No. 4,157,293 claims a process for converting $C_2$–$C_{10}$ hydrocarbons consisting essentially of paraffins, olefins or their mixtures over a catalyst comprising a zeolite having a $SiO_2/Al_2O_3$ mole ratio of at least 12, a Constraint Index of 1 to 12 and containing zinc and another named metal. U.S. Pat. No. 4,465,884, teaches conversion of $C_3^+$ olefins to higher molecular weight product comprising non-aromatics over catalyst comprising, for example, zeolite Beta having a silica/alumina mole ratio greater than 100.

Olefinic feedstocks may be obtained from various sources, including fossil fuel processing streams, such as gas separation units, cracking of $C_2^+$ hydrocarbons, coal byproducts, and various synthetic fuel processing streams. Cracking of ethane and conversion of conversion effluent is disclosed in U.S. Pat. No. 4,100,218 and conversion of ethane to aromatics over Ga-ZSM-5 is disclosed in U.S. Pat. No. 4,350,835. Olefinic effluent from fluidized catalytic cracking of gas oil or the like is a valuable source of olefins, mainly $C_3$–$C_4$ olefins.

SUMMARY OF THE INVENTION

The present invention relates to a novel process for converting feedstock comprising $C_2^+$ olefins, $C_2$–$C_7$ paraffins or a mixture thereof to product comprising $C_5^+$ hydrocarbons over a catalyst comprising siliceous zeolite having been prepared by the method comprising providing zeolite Beta containing boron and aluminum, treating the zeolite with silicon tetrachloride at a temperature and for a time sufficient to replace boron with silicon, and recovering the siliceous zeolite having reduced boron content but substatially preserved initial aluminum content.

DESCRIPTION OF DRAWING

The FIGURE represents data of Example 1 showing that treatment of boron-containing zeolite Beta with silicon tetrachloride as required herein reduces boron sites while aluminum sites remain essentially unchanged, each measured by ion exchange capacity.

DESCRIPTION OF SPECIFIC EMBODIMENTS

The contents of application Ser. No. 864,746, now U.S. Pat. No. 4,701,313, are entirely incorporated herein by reference.

The feedstock to the present process comprises $C_2$–$C_7$ paraffins and/or olefins of at least two carbon atoms. Product of the present process comprises $C_5$+ hydrocarbons. When the feedstock comprises paraffins, product comprises aromatics, e.g., benzene, toluene and xylenes, and conversion conditions include a temperature of from about 100° C. to about 700° C., a pressure of from about 10 kPa to about 34,500 kPa, preferably from 10 kPa to 11,000 kPa, a liquid hourly space velocity (LHSV) of from about 0.1 $hr^{-1}$ to about 500 $hr^{-1}$, preferably from 0.5 $hr^{-1}$ to 400 $hr^{-1}$, and a hydrogen/hydrocarbon mole ratio of from 0 (no added hydrogen) to aboout 20. Under these same conversion conditions, a feedstock comprising $C_2$–$C_7$ olefins is converted to product comprising aromatics, e.g., benzene, toluene and xylenes.

A feedstock to the present process may comprise primarily $C_2$–$C_7$ olefins for conversion to gasoline and distillate products when the conversion conditions are tailored to be within the following ranges. In general, the temperature will be maintained at from about 190° C. to about 375° C., the pressure at from about 400 kPa to about 11000 kPa, preferably from 400 kPa to about 7000 kPa, and the liquid hourly space velocity (LHSV based on feedstock olefin) at from about 0.3 to about 2, preferably from 0.5 to 2 $hr^{-1}$. Specifically when the present process is operated in the distillate mode, the temperature will be from about 190° C. to about 315° C., the pressure from about 4200 kPa to about 11000 kPa, preferably from 4200 kPa to 7000 kPa, and the LHSV from about 0.3 to about 1.0 $hr^{-1}$, preferably from 0.5 to 1.0 $hr^{-1}$. When the present process is operated in the gasoline mode, the temperature will be from about 230° C. to about 375° C., the pressure from about 400 kPa to about 4700 kPa, preferably from 400 kPa to 3000 kPa and the LHSV from about 0.3 to about 2.0 $hr^{-1}$, preferably from 0.5 to 2.0 $hr^{-1}$. The feedstocks, products, process conditions and other variables for conversion of olefins to higher hydrocarbons are detailed in U.S. Pat. No. 4,456,779, incorporated entirely herein by reference.

A feedstock to the present process may comprise $C_2$+ olefins, preferably $C_3$–$C_{18}$ olefins, for conversion to a liquid product which may then be treated to obtain a lube oil fraction. The process for production of lubricating oils hereby will comprise contacting the olefin feedstock with the catalyst at a temperature of from about 175° C. to about 345° C., a pressure of from about 6,500 kPa to about 34,500 kPa and a weight hourly space velocity of from about 0.1 $hr^{-1}$ to about 10 $hr^{-1}$ in order to obtain a liquid product from which said lubricating oils boiling above about 315° C. are separated, such as by distillation. U.S. Pat. No. 4,517,399 shows this process in general with a different catalyst and is incorporated herein by reference as to process particulars.

For the catalyst of this invention, zeolite crystallization is performed by the proper choice of aluminum and another species acceptable to the zeolite framework so that the product contains the desired ultimate amount of aluminum and excess of the other species to facilitate the desired synthesis. The concentration of the other species is conventional and determinable by those skilled in the art. Preferably, the other species will comprise boron. Of course, other such species, having characteristics substantially the same as or equivalent to boron, can be used. The product is subsequently exposed to a flowing gas stream containing silicon tetrachloride at a temperature and for a time of exposure selected to extract substantially all of the other species. However, temperature and time are selected to substantially avoid extraction of aluminum from the lattice of the zeolite, and may be within the ranges of from about room temperature to about 400° C., for a time of from about 0.5 hour to about 48 hours. Thus, selection of the final aluminum content is accomplished by controlling the aluminum/other species ratio during synthesis and choosing conditions for the silicon substitution which will selectively convert the other species.

The temperature at which the removal of the other species will occur within the above range is determinable by a person skilled in this art.

Concerning the other species, the species is to be selected according to the teachings of this invention so that it permits extraction of substantially all, if not all, under certain temperature and time conditions, while substantially avoiding extraction of aluminum from the lattice of the zeolite. Such other species are known to those skilled in the art or can be selected by those skilled in the art without undue experimentation. As mentioned above, boron is the preferred other species.

The structure of the zeolite for use as catalyst in this invention is that of zeolite Beta.

According to another embodiment of the invention, it relates to a zeolite having an intrinsically high aluminum concentration as synthesized. The aluminosilicate zeolite is converted into a form comprising at least two cationic constituents in selected ratio. The resulting zeolite is such that one of the cationic constituents, which is relatively easily converted by subsequent silicon treatment, exists in the concentration corresponding to the ultimately desired aluminum concentration to be attained on the zeolite. For example, the aluminosilicate synthesized is subjected to a base exchange solution containing sodium and ammonium ion so that subsequent drying and calcining will produce a mixture of the protonic and the sodium forms. The silicon halide treatment is then chosen under conditions of severity, such that the protonated aluminum will readily react, that is, the following reaction:

will take place, substituting a silicon atom at the site. The acid and aluminum chloride are volatilized. Again, silicon tetrachloride is the preferred silicon substitution agent. The preceding illustration is merely illustrative and not limiting.

This procedure may be used based on the pair of cations being ammonium and alkali metal ion, and other pairs that may prove to be sufficiently different in reactivity with the silicon substitution agent. In all cases, the silicon substitution treatment is chosen in conditions of temperature and time to provide adequate protection of the aluminum framework species that is not to be extracted. The conditions mentioned in the preceding treatment occurring during crystallization can be utilized here. The selection of the source of the sodium and ammonium ion is readily made by those skilled in the art. The drying and calcining procedures are conventional and known to those skilled in the art.

Thus, the catalyst treatment is characterized by a step of selecting an amount of aluminum to be retained in a product by use of a silicon substitution treatment which will substantially preserve the selected amount of aluminum framework species.

Without wishing to be bound by any particular theory of operability, it is believed that the silicon component of the silicon halide is deposited at the site previously occupied by the more reactive component to the silicon halide. Thus, it is considered that this method leads to even greater stabilization, because the vacancy left by this component is "filled" with another atom or molecule. However, the healing mechanism is not really known. Furthermore, this method can be used to introduce different atoms into the aluminosilicate structure, thus modifying catalytic function.

The improved characteristics of zeolite Beta treated in this fashion render it particularly attractive for application in the present process.

The zeolite Beta treated as above can be in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In practicing the desired chemical conversion process, it may be useful to composite the treated zeolite Beta with matrix-comprising material resistant to the temperature and other conditions employed in the process. Such matrix material is useful as a binder and imparts additional resistance to the catalyst for the temperature, pressure and reactant feed stream velocity conditions allowed in the present process. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which an be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

In order to more fully illustrate the nature of the invention and the manner of practicing same, the following examples are presented.

EXAMPLE 1

Zeolite Beta was obtained containing boron and aluminum as shown in the Figure. The boron and aluminum contents are depicted in the Figure by ion exchange capacity in meq/g. The zeolite exhibited over 0.9 meq/g ion exchange capacity attributable to boron sites, and 0.08 meq/g ion exchange capacity attributable to aluminum sites. The zeolite Beta was contacted with silicon tetrachloride vapor at mild conditions, including atmospheric pressure and 315° C. for a total of about 20 hours. Periodically during the contacting period, the zeolite Beta was analyzed for remaining boron and aluminum sites by measuring its ion exchange capacity. The data generated is presented in the Figure, showing that the ion exchange capacity for the aluminum sites remained essentially constant, indicating no removal of aluminum sites from the zeolite Beta framework. The data also showed that the ion exchange capacity for the boron sites decreased steadily and significantly while the aluminum sites remained constant. After about 20 hours reaction time, the zeolite still exhibited about 0.08 meq/g ion exchange capacity attributable to the aluminum sites. This corresponds to a silica/alumina mole ratio of about 280.

EXAMPLE 2

Zeolite Beta is obtained containing boron and aluminum, and exhibits over 0.9 meq/g ion exchange capacity attributable to boron sites, and 0.43 meq/g ion exchange capacity attributable to aluminum sites. The zeolite Beta is contacted with silicon tetrachloride vapor at mild conditions, including atmospheric pressure and 315° C. for a total of about 20 hours. After 20 hours reaction time, the zeolite still exhibits about 0.43 meq/g ion exchange capacity attributable to the aluminum sites with ion exchange capacity attributable to boron sites decreased to about the same level. This corresponds to a silica/alumina mole ratio of about 75.

The silicon tetrachloride treated catalyst is exchanged to the ammonium form by refluxing with 1N ammonium chloride solution at 90° C. for 1 hour, thoroughly wased with water, dried and air calcined at 500° C. The finished catalyst is pelleted, crushed and sized to 30–40 mesh (Tyler) for catalytic evaluation.

EXAMPLE 3

Propylene is converted over the catalyst of Example 2 at 265° C., 6,800 kPa, 1 hr$^{-1}$ WHSV and a hydrogen/hydrocarbon mole ratio of 1. The results of analysis of the liquid product are tabulated below:

| Product Component | Wt. % |
| --- | --- |
| IBP to about 165° C. Naphtha | 19.8 |
| 165° C. to about 345° C. Distillate | 68.3 |

-continued

| Product Component | Wt. % |
| --- | --- |
| 345° C. + Lube | 9.1 |

Although the invention has been described in conjunction with specific embodiments, it is evident that alternatives and variations will be apparent to those skilled in the art in light of the foregoing description. Accordingly, the invention is intended to embrace all of the alternatives and variations that fall within the spirit and scope of the appended claims.

What is claimed is:

1. A process for converting a feedstock comprising $C_2+$ olefins, $C_2-C_7$ paraffins or mixtures thereof to conversion product comprising $C_5+$ hydrocarbon compounds, which comprises contacting said feedstock at conversion conditions sufficient to convert said feedstock to said product with a catalyst composition comprising a siliceous zeolite prepared by the method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

2. The process of claim 1 wherein said catalyst composition comprises said siliceous zeolite and a matrix.

3. The process of claim 2 wherein said matrix is alumina-containing material.

4. The process of claim 2 wherein said catalyst composition is in the form of an extrudate.

5. The process of claim 2 wherein said catalyst composition is in the form of beads.

6. The process of claim 1 wherein said conversion conditions include a temperature of from about 100° C. to about 700° C., a pressure of from about 10 kPa to about 34,500 kPa, a liquid hourly space velocity of from about 0.1 $hr^{-1}$ to about 500 $hr^{-1}$ and a hydrogen/hydrocarbon mole ratio of from 0 to about 20.

7. A process for converting a feedstock comprising $C_2-C_7$ olefins to conversion product comprising $C_5+$ hydrocarbon compounds, which comprises contacting said feedstock at conversion conditions sufficient to convert said feedstock to said product with a catalyst composition comprising a siliceous zeolite prepared by the method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

8. The process of claim 7 wherein said catalyst composition comprises said zeolite and a matrix.

9. The process of claim 8 wherein said matrix is alumina-containing material.

10. The process of claim 7 wherein said conversion conditions include a temperature of from about 190° C. to about 375° C., a pressure of from about 400 kPa to about 11,000 kPa and a liquid hourly space velocity of from about 0.3 $hr^{-1}$ to about 2 $hr^{-1}$.

11. The process of claim 10 wherein said conversion conditions include a temperature of from about 190° C. to about 315° C., a pressure of from about 4,200 kPa to about 11,000 kPa and a liquid hourly space velocity of from about 0.3 $hr^{-1}$ to about 1 $hr^{-1}$.

12. The process of claim 10 wherein said conversion conditions include a temperature of from about 230° C. to about 375° C., a pressure of from about 400 kPa to about 4,700 kPa and a liquid hourly space velocity of from about 0.3 $hr^{-1}$ to about 2 $hr^{-1}$.

13. A process for converting a feedstock comprising $C_3-C_{18}$ olefins to conversion product comprising a lubricating oil fraction which comprises contacting said feed-stock at conversion conditions sufficient to convert said feed-stock to said product with a catalyst composition comprising a siliceous zeolite prepared by the method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

14. The process of claim 13 wherein said catalyst composition comprises said zeolite and a matrix.

15. The process of claim 14 wherein said matrix is alumina-containing material.

16. The process of claim 13 wherein said conversion conditions include a temperature of from about 175° C. to about 345° C., a pressure of from about 6,500 kPa to about 34,500 kPa and a weight hourly space velocity of from about 0.1 $hr^{-1}$ to about 10 $hr^{-1}$.

* * * * *